United States Patent Office 3,148,829
Patented Sept. 15, 1964

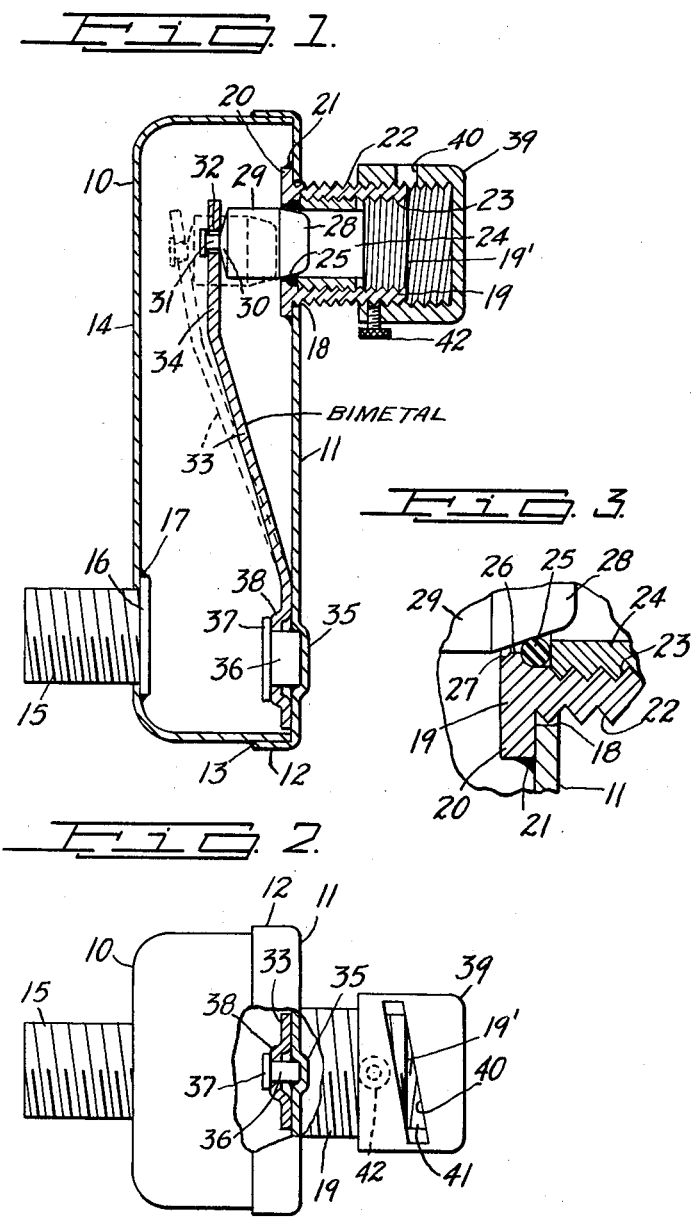

3,148,829
QUICK VENTING RADIATOR VALVES
Andrew A. Leopardo, 125 N. 11th St., Newark, N.J.
Filed June 19, 1963, Ser. No. 288,950
7 Claims. (Cl. 236—66)

This invention relates to valves for use in connection with steam radiators. More particularly, the invention deals with a valve of this type and kind having adjustable means controlling quick venting of the radiator in providing efficient operation of radiators in a heating system, as well as in controlling temperature in various rooms of a home or building in maintaining a more or less balanced heating system and, at the same time, effecting economy in operation of the system.

Still more particularly, the invention deals in a valve structure of the character defined, wherein the valve member has a free floating mounting in connection with the bimetal element of the valve to insure positive seating of the valve member at all times.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view through a valve made according to my invention, indicating the valve in closed position in full lines and in open position in dotted lines.

FIG. 2 is a plan view of the structure as shown in FIG. 1, with part of the construction broken away and in section; and FIG. 3 is a sectional detail view of part of the structure shown in FIG. 1 on an enlarged scale.

In illustrating one adaptation and use of my invention, I have shown at 10 a valve casing, preferably oblong and rectangular in form, the open side of which is closed by a cover plate 11, the flange 12 of which is snugly fitted upon the casing 10 and soldered thereto, as indicated at 13. Mounted in the lower portion of the wall 14 of the casing is a threaded nipple 15, the flange 16 of which is soldered to the wall 14, as indicated at 17.

The upper portion of the cover 11 has an aperture 18, in which is mounted a discharge sleeve 19, the inner flange end 20 of which is soldered to the cover 11, as indicated at 21. The sleeve 19 has external threads 22 and internal threads 23.

Mounted in the threaded bore 23 is a threaded bushing 24 for retaining an O-ring 25 is seated position in the sleeve 19, as clearly illustrated in FIG. 3 of the drawing. As noted in this figure, the reduced diameter bore 26 of the sleeve 19 has a bevelled outer surface 27 for free guidance of the contracted or tapered end 28 of the valve member 29, so as to establish positive seating of 28 upon the O-ring 25 in effecting a positive seal or closure.

The other end of the member 29 is conical in form, as seen at 30, and terminates in a projecting riveted-over pin 31, having a free mounting in the aperture 32 of a bimetal element 33, as clearly illustrated in FIG. 1 of the drawing. The free mounting of the valve member 29 facilitates movement of this member into the position indicated in dotted lines when the element 33 is in the dotted line position supporting the valve member 29 in the open position, as diagrammatically illustrated. This free mounting facilitates accurate seating of the valve member on the O-ring when the element 33 is moved into operative position, as shown in full lines in FIG. 1 of the drawing.

The element 33 is generally of the contour in section in FIG. 1 of the drawing, in other words, includes the end 34 which will assume a position substantially parallel to the inner surface of the flanged portion 20 of the sleeve 19.

The lower portion of the wall 11 has an outwardly offset key or socket portion 35, in which a coupling pin 36 is soldered or otherwise fixed, the pin having a rivetedover or otherwise formed head 37, which seats upon an offset portion 38 formed in the element 33, as clearly noted in FIGS. 1 and 2 of the drawing. The offset 38 is preferably formed to clear any soldering welding or the like which might extend around the pin 36 and, in this manner, a flat surface engagement of the formed end portion 38 of the element 33 can be accomplished upon the inner surface of the cover 11.

Considering FIGS. 1 and 2 of the drawing, I have shown at 39 an adjustable vent control cap internally threaded to engage the threads 22 on the sleeve 19, the cap 39 having a circumferentially extending and angularly arranged vent aperture 40 operating in connection with the outer end portion 19' of the sleeve 19 in controlling and regulating the size of the vent opening through the cap 39. In the position shown in FIGS. 1 and 2 of the drawing, the cap 39 is in what may be termed a half open position, providing a vent passage, as diagrammatically seen at 41 in FIG. 2 of the drawing. By moving the cap 39 outwardly, the vent 41 can be increased in size and, by moving the cap 39 inwardly, the vent 41 can be reduced in size and, by virtue of the angular arrangement of the vent aperture 40, a relatively fine adjustment can be accomplished as and when such adjustment is desirable. Considering FIG. 1 of the drawing, it will appear that a setscrew 42 is mounted in the cap and operatively engages the sleeve 19 in retaining the cap in any desired position of adjustment.

From the foregoing, it will be apparent that my improved valve is of extremely simple, as well as economical construction and, at the same time, a valve is provided which, by virtue of the adjustable cap employed, can operate to provide the necessary vent requirements in radiators consistent with location of the radiators in a room and to meet demands for quick and effective, as well as well-balanced heating of groups of rooms in a given heating system. It is a well-known fact that, with present valve constructions, it is extremely difficult to provide a balanced operation of a heating system in supplying the necessary heat to cold areas or sections of a complete system; whereas, at the same time, minimizing the distribution of heat in areas which require a minimum amount of heating.

From the foregoing, it will be apparent that a single valve structure, such as that disclosed, can be incorporated on radiations throughout any complete system and the caps 39 adjusted to provide the required venting in obtaining and maintaining the balanced and effective heating of the system.

One of the distinct advantages with my improved valve structure resides in the fact that the various operative parts are all mounted on or assembled on the cover 11 and this assemblage is then readily attachable to the casing 10 in the manner clearly illustrated.

Having fully described my invention, what I claim as new and desire to secure by Letters Patent is:

1. A quick venting valve of the character defined comprising an elongated casing, an inlet in one end of the casing, an outlet at the opposed end of the casing, the outlet comprising a sleeve projecting from the casing, the sleeve having means forming a valve seat at the inner portion thereof, a bimetal element supported within the casing, one end of the element being fixed to a wall of the casing, a valve member freely supported in the other end portion of said element and movable toward and from said valve seat in controlling discharge through said sleeve, a cap adjustably supported on the sleeve, and said cap having a vent opening movable relatively to the outer end of the sleeve in controlling size of the vent passage through said opening.

2. A valve as defined in claim 1, wherein said vent opening extends circumferentially on said cap.

3. A valve as defined in claim 1, wherein said vent opening is angularly arranged on said cap.

4. A valve as defined in claim 3, wherein means is employed for retaining said cap in different positions of adjustment.

5. A valve as defined in claim 1, wherein means is employed for retaining said cap in different positions of adjustment.

6. A valve as defined in claim 1, wherein the fixed end of the element comprises an aperture in said end of the element engaging a pin fixed to the wall of said casing.

7. A valve of the character defined comprising an oblong casing having an inlet nipple fixed to the casing at one end thereof, a cover monuted on the casing, the cover having an outlet sleeve fixed thereto and disposed at the opposed end portion of the casing, a bimetal element mounted on said cover and arranged within the casing, said element freely supporting at its end a valve member, means including a bushing mounted in said sleeve supporting an O-ring in the sleeve to be engaged by said valve member in controlling discharge through said sleeve, a cap adjustable on said sleeve, and said cap having a vent opening operating in conjunction with the sleeve in controlling adjustment of the size of the vent passage of said valve in the use thereof.

References Cited in the file of this patent
UNITED STATES PATENTS

| 1,547,652 | Jacobus | July 28, 1925 |
| 1,656,772 | Bucknell et al. | Jan. 17, 1928 |
| 2,197,250 | Davies | Apr. 16, 1940 |
| 2,845,227 | Leonardis | July 29, 1958 |

FOREIGN PATENTS

| 1,077,463 | France | Apr. 28, 1954 |